US008750162B2

(12) United States Patent
Lee et al.

(10) Patent No.: US 8,750,162 B2
(45) Date of Patent: Jun. 10, 2014

(54) METHOD FOR TRANSMITTING RANGING INFORMATION IN WIRELESS COMMUNICATION SYSTEM AND TERMINAL THEREOF

(75) Inventors: Hyun-Woo Lee, Gyeonggi-Do (KR); Min-Seok Noh, Gyeonggi-Do (KR); Yeong-Hyeon Kwon, Gyeonggi-Do (KR); Jin-Sam Kwak, Gyeonggi-Do (KR); Dong-Cheol Kim, Gyeonggi-Do (KR); Sung-Ho Moon, Gyeonggi-Do (KR); Seung-Hee Han, Gyeonggi-Do (KR)

(73) Assignee: LG Eletronics Inc., Seoul (KR)

( * ) Notice: Subject to any disclaimer, the term of this patent is extended or adjusted under 35 U.S.C. 154(b) by 100 days.

(21) Appl. No.: 13/142,842

(22) PCT Filed: Jan. 5, 2010

(86) PCT No.: PCT/KR2010/000039
§ 371 (c)(1),
(2), (4) Date: Jun. 29, 2011

(87) PCT Pub. No.: WO2010/077124
PCT Pub. Date: Jul. 8, 2010

(65) Prior Publication Data
US 2012/0044833 A1 Feb. 23, 2012

Related U.S. Application Data

(60) Provisional application No. 61/142,618, filed on Jan. 5, 2009, provisional application No. 61/145,956, filed on Jan. 20, 2009.

(30) Foreign Application Priority Data

Nov. 11, 2009 (KR) .................. 10-2009-0108788

(51) Int. Cl.
*H04W 74/08* (2009.01)
(52) U.S. Cl.
USPC ............ 370/254; 370/332; 370/333; 370/334

(58) Field of Classification Search
USPC ........................................................ 370/274
See application file for complete search history.

(56) References Cited

U.S. PATENT DOCUMENTS 7,158,484 B1 * 1/2007 Ahmed et al. ................ 370/254
7,307,973 B2 * 12/2007 Song et al. .................... 370/331
(Continued)

FOREIGN PATENT DOCUMENTS

| CN | 1930812 | 3/2007 |
| KR | 100589898 | 6/2006 |
| WO | 2006/016765 | 2/2006 |

OTHER PUBLICATIONS

Hyun Woo Lee, Broadband Wireless Access, Jan, 7, 2008, IEEE 802.16 p. 1-10.*

(Continued)

*Primary Examiner* — Ian N Moore
*Assistant Examiner* — Lakeram Jangbahadur
(74) *Attorney, Agent, or Firm* — Lee, Hong, Degerman, Kang & Waimey

(57) ABSTRACT

Disclosed is a method for configuring a ranging channel in various frame structures and using the same in a communication system. A ranging channel is effectively configured according to a data structure, namely, frame structure, transmitted and received between a mobile station (MS) and a base station (BS) in a wireless communication system, and ranging information is transmitted therethrough to thereby improve performance of a communication channel and resource efficiency. In the wireless communication system, a ranging channel is configured by using a time interval, such as an idle time, an idle symbol, an RTG, a TTG, and the like, not actually used for transmission of data or a signal in a data structure, namely, in a frame structure, transmitted and received between an MS and a BS, to transmit ranging information, so the channel performance and resource efficiency can be improved.

13 Claims, 6 Drawing Sheets

(56) References Cited

U.S. PATENT DOCUMENTS

| | | | |
|---|---|---|---|
| 7,508,842 B2* | 3/2009 | Baum et al. | 370/468 |
| 7,515,641 B2* | 4/2009 | Yu et al. | 375/260 |
| 7,587,212 B2* | 9/2009 | Kang et al. | 455/510 |
| 7,664,480 B2* | 2/2010 | Kim et al. | 455/343.2 |
| 7,693,517 B2* | 4/2010 | Etemad et al. | 455/436 |
| 7,885,214 B2* | 2/2011 | Ahmadi et al. | 370/295 |
| 7,885,660 B2* | 2/2011 | Van Rensburg et al. | 455/442 |
| 7,912,425 B2* | 3/2011 | Ihm et al. | 455/39 |
| 7,929,476 B2* | 4/2011 | Kim et al. | 370/315 |
| 7,940,740 B2* | 5/2011 | Krishnamurthy et al. | 370/344 |
| 7,965,631 B2* | 6/2011 | Chin et al. | 370/230.1 |
| 8,014,264 B2* | 9/2011 | Li et al. | 370/203 |
| 8,019,385 B1* | 9/2011 | Mansour et al. | 455/561 |
| 8,031,583 B2* | 10/2011 | Classon et al. | 370/208 |
| 8,059,676 B2* | 11/2011 | Moon et al. | 370/464 |
| 8,085,703 B2* | 12/2011 | Chin et al. | 370/319 |
| 8,107,428 B2* | 1/2012 | Chong et al. | 370/329 |
| 8,134,938 B2* | 3/2012 | Yi et al. | 370/255 |
| 8,149,782 B2* | 4/2012 | Noh et al. | 370/330 |
| 8,160,029 B2* | 4/2012 | Dominique et al. | 370/335 |
| 8,160,125 B2* | 4/2012 | Clerckx et al. | 375/219 |
| 8,170,049 B2* | 5/2012 | Kim et al. | 370/447 |
| 8,199,706 B2* | 6/2012 | Bertrand et al. | 370/329 |
| 8,199,738 B2* | 6/2012 | Sohn et al. | 370/343 |
| 8,208,429 B2* | 6/2012 | Hahn et al. | 370/328 |
| 8,208,851 B2* | 6/2012 | Kwak et al. | 455/13.1 |
| 8,218,526 B2* | 7/2012 | Bertrand et al. | 370/350 |
| 8,228,834 B2* | 7/2012 | Maheshwari et al. | 370/315 |
| 8,233,377 B2* | 7/2012 | Masaoka | 370/208 |
| 8,274,915 B2* | 9/2012 | Lu | 370/254 |
| 8,300,570 B2* | 10/2012 | Zhang et al. | 370/315 |
| 8,320,336 B2* | 11/2012 | Youn et al. | 370/335 |
| 8,576,786 B2* | 11/2013 | Liao et al. | 370/329 |
| 2005/0195791 A1* | 9/2005 | Sung et al. | 370/342 |
| 2007/0281654 A1* | 12/2007 | Choi | 455/277.1 |
| 2010/0111017 A1* | 5/2010 | Um et al. | 370/329 |
| 2010/0150099 A1* | 6/2010 | Chen et al. | 370/330 |
| 2010/0150100 A1* | 6/2010 | Chen et al. | 370/330 |
| 2010/0165942 A1* | 7/2010 | Liao et al. | 370/329 |
| 2012/0044833 A1* | 2/2012 | Lee et al. | 370/254 |

OTHER PUBLICATIONS

Lee, et al., "Proposed Text of Ranging Section for the IEEE 802.16m Amendment," IEEE 802.16 Broadband Wireless Access Working Group, IEEE 802.16m-09/0335r1, Jan. 2008, 11 pages (relevant portions: sections 1-3, 15).

The State Intellectual Property Office of the People's Republic of China Application Serial No. 201080003956.7, Office Action dated Jul. 25, 2013, 7 pages.

* cited by examiner

METHOD FOR TRANSMITTING RANGING INFORMATION IN WIRELESS COMMUNICATION SYSTEM AND TERMINAL THEREOF

CROSS-REFERENCE TO RELATED APPLICATIONS

This application is the National Stage filing under 35 U.S.C. 371 of International Application No. PCT/KR2010/000039, filed on Jan. 5, 2010, which claims the benefit of earlier filing date and right of priority to Korean Application No. 10-2009-0108788, filed on Nov. 11, 2009, and also claims the benefit of U.S. Provisional Applications Ser. Nos. 61/145,956, filed on Jan. 20, 2009 and 61/142,618, filed on Jan. 5, 2009, the contents of all of which are incorporated by reference herein in their entirety.

TECHNICAL FIELD

The present invention relates to a method for configuring a ranging channel in various frame structures and using the same in a communication system.

BACKGROUND ART

IEEE (Institute of Electrical and Electronics Engineers) 802.16 standard provides techniques and protocols to support a broadband wireless access. Standardization started from 1999 and IEEE 802.16-2001 was approved in 2001. It is based on a single carrier physical layer called 'WirelessMAN-SC'. Later, besides the 'WirelessMAN-SC', 'WirelessMAN-OFDM' and 'WirelessMAN-OFDMA' were added to a physical layer in IEEE 802.16a standard approved in 2003. After the IEEE 802.16a standard was completed, a revised IEEE 802.16-2004 standard was approved in 2004. IEEE 802.16-2004/Cor1 (referred to as 'IEEE 802.16e', hereinafter) was finalized in the form of 'corrigendum' in 2005 in order to resolve and correct bugs and errors of the IEEE 802.16-2004 standard.

In order to receive and demodulate data of a wireless communication system, synchronization needs to be matched between a receiver and a transmitter. In particular, for a successful data transmission and reception in a mobile communication system in which a channel environment between a base station (BS) and a mobile station (MS) continuously changes, the synchronization between the BS and the MS should be matched through close signaling.

A communication channel between the BS and the MS includes a downlink (DL) channel proceeding from the BS to the MS and an uplink (UL) channel proceeding from the MS to the BS. In downlink, a plurality of MSs match downlink synchronization with data frames transmitted from the BS. In order for the MSs to match the synchronization, the BS may insert a preamble for synchronization into a portion of a frame. The MSs match synchronization for the downlink channels through the preamble. Alternatively, the BS may use a synchronization channel.

In uplink, each MS must transmit data through a time and/or frequency domain allocated to each MS in order to avoid an interference between the MSs and allow the BS to receive data. Thus, for the uplink synchronization, each MS needs to adjust synchronization through signaling between the BS and the MSs in consideration of the channel environment.

A signal exchanged between the MSs and the BS to match uplink synchronization in the IEEE 802.16 standard is called a ranging signal. A ranging process is a sequential process of adjusting transmission power through the process of exchanging the ranging signal between the MS and the BS and matching time/frequency synchronization. That is, the sequential process for obtaining uplink synchronization may be called the ranging process.

In an initial ranging, an accurate timing offset is obtained between the MS and the BS and transmission power is adjusted at the early stage. When power is turned on, the MS obtains downlink synchronization from a received downlink preamble signal. Subsequently, the MS performs initial ranging in order to adjust the uplink timing offset and the transmission power. Unlike the initial ranging, a periodic changing is a process of periodically tracking an uplink timing offset and a reception signal strength following the initial ranging.

In attempting a ranging process, a pre-set ranging code is used as a ranging signal.

Configuration of ranging channels in various frame structures will be described. First, technical terms will now be described.

In the description of the present invention, $T_{CP}$ is an OFDMA cyclic prefix duration, Tu is an available OFDMA symbol duration, and Ts ($=T_{CP}+T_u$) is an OFDMA symbol duration including a CP (cyclic prefix).

A TTG, an RTG, an SSTTG, and an SSRTG are defined for a time division duplex (TDD) frame structure in 802.16e of IEEE P802.16 Rev2 standard.

1) RTG (Base Station (BS) Receive/Transmit Transition Gap)

The RTG is a gap between the last sample of an uplink burst and a first sample of a subsequent downlink burst at an antenna port of the BS having TDD transceiver. The RTG, namely, the gap, is an allowable time for the BS to switch from a reception mode to a transmission mode. During this gap, the BS simply ramps up a BS transmitter carrier and allows a transmission/reception antenna switch to actuate, without transmitting modulated data. The RTG is not applicable for frequency division duplex (FDD) systems.

2) TTG (Base Station (BS) Transmit/Receive Transition Gap)

The TTG is a gap between the last sample of the downlink (DL) burst and the first sample of the subsequent uplink (UL) burst at the antenna port of the BS having a time division duplex (TDD) transceiver. The TTG, namely, the gap, is an allowable time for the BS to switch from the transmission mode to the reception mode. During this gap, the BS simply ramps down a BS transmitter carrier and allows a transmission/reception antenna switch to actuate and a BS receiver to operate, without transmitting modulated data. The TTG is not applicable for frequency division duplex (FDD) systems.

3) SSRTG: (Subscriber Station Receive/Transmit Gap)

The SSRTG is a minimum receive-to-transmit turnaround gap. The SSRTG is the gap measured from the time of the last sample of the received burst to the first sample of the transmitted burst at the antenna port of the SS.

4) SSTTG (Subscriber Station Transmit/Receive Gap)

The SSTTG is a minimum transmit-to-receive turnaround gap. The STTG is the gap measured from the time of the last sample of the transmitted burst to the first sample of the received burst at the antenna port of the SS).

Meanwhile, the length of the TTG and the RTG is defined to be at least 5 μs in the 802.16e standard, and the BS informs the MSs about that through DCD channel encoding. Here, the DCD channel encoding is as shown in Table 1.

TABLE 1

| Name | Type (1 byte) | Length | Value(variable length) | PHY scope |
|---|---|---|---|---|
| Downlink_Burst_Profile | 1 | — | May appear more than once(see 6.3.2.3.1). The length is the number of bytes in the overall object, including embedded TLV items. | All |
| BS EIRP | 2 | 2 | Signed in units of 1 dBm | All |
| Frame duration | 3 | 4 | The number of PSs contained in a Burst FDD or TDD frame. Required only for framed DLs. | SC |
| PHY Type | 4 | 1 | The PHY Type to be used. | SC |
| Power adjustment rule | 5 | 1 | 0 = Preserve Peak Power1 = Preserve Mean Power Describes the power adjustment rule when performing a transition from one burst profile to another. | SC |
| Channel Nr | 6 | 1 | DL channel number as defined in 8.5. Used for license-exempt operation only. | OFDM, OFDMA |
| TTG | 7 | 2 for TDD, 4 FOR H-FDD | TTG (in PSs). Note: for H-FDD, the first set of 2 bytes corresponds to H-FDD Group 1, While the second set of 2 bytes corresponds to H-FDD Group 2 | OFDMA |
| RTG | 8 | 1 for TDD, 2 FOR H-FDD | RTG (in PSs). Note: for H-FDD, the first byte corresponds to H-FDD Group 1, While the second byte corresponds to H-FDD Group 2. | OFDMA |

Also, the length of the SSTTG and the SSRTG may be transmitted between the BS and the MS through SBC-REQ/RSP management message encoding in the 802.16e standard.

However, the message is generated between the BS and the MS for a capability negotiation during an initial network entry procedure, and the length cannot be known in the state that the MS initially transmits a ranging code to the BS.

TABLE 2

| Type | Length | Value | Scope |
|---|---|---|---|
| 2 | 2 | Bits: 0-7: SSTTG(μs) Bits: 8-15: SSRTG(μs)Allowed values: OFDM mode: TDD and H-FDD 0 . . . 100. Other modes: TDD: 0 . . . 50; H-FDD: 0 . . . 100. | SBC-REQ (see 6, 3, 2, 3, 23) SBC-RSP (see 6, 3, 2, 3, 24) |

In order to guarantee a minimum performance of the MS from a WiMAX Forum Mobile System Profile Release 1.0 (Revision 1.4.0), the SSRTG and the SSTTG may have a time length of 50 μs, while the TTG and the RTG may have different values according to system bandwidth as shown in Table 3 below:

TABLE 3

| | | | | TTG | | RTG | |
|---|---|---|---|---|---|---|---|
| BW [MHz] | n | Fs [MHz] | PS [us] | [PS] | [us] | [PS] | [us] |
| 10 | 1.12 | 11.2 | 0.357143 | 296 | 105.7143 | 168 | 60 |
| 8.75 | 1.142857 | 10 | 0.4 | 218 | 87.2 | 186 | 74.4 |
| 7 | 1.142857 | 8 | 0.5 | 376 | 188 | 120 | 60 |
| 5 | 1.12 | 5.6 | 0.714286 | 148 | 105.7143 | 84 | 60 |
| 3.5 | 1.142857 | 4 | 1 | 188 | 188 | 60 | 60 |

In Table 3, the BW indicates a system bandwidth, 'n' is a sampling factor and 8/7 or 28/25 is used depending on a BW. Fs is a sampling frequency, which is defined as Fs=floor (n·BW/8000)?8000. A PS is a physical slot, which is defined as PS=4/Fs. The values of TTG and RTG are indicated by PS and us.

FIG. 1 illustrates a type-1 frame structure in the TDD duplex mode. In FIG. 1, $T_{CP}$ in the 802.16m standard is $T_{CP}=1/8 \cdot T_u$. In FIG. 1, a superframe having a 20 ms duration includes four frames. Each frame has 5 ms and includes eight subframes. The subframes are divided into a type-1 subframe (or a regular subframe) and a type-1 short subframe (or an irregular subframe). The type-1 subframe includes six OFDMA symbols of 0.617 ms. The type-1 short subframe occupies the same time as that of the type-1 subframe, but is different from the type-1 subframe in that the last OFDMA symbol of the type-1 short subframe is an idle symbol. The idle symbol is not used for a transmission. While changing from DL to UL, there is an idle time of 102.857 us, and an idle time of 62.86 us exists at a switching point at which US is changed to DL.

FIG. 2 illustrates the type-1 frame structure in the FDD duplex mode. In FIG. 2, $T_{CP}$ in the 802.16m standard is TCP=1/8·$T_u$. In FIG. 2, a superframe having a 20 ms duration includes four frames. Each frame has 5 ms and includes eight subframes, and there exists an idle time of 62.86 us. A subframe includes six OFDM symbols of 0.617 ms.

FIG. 3 illustrates a frame structure in a TDD and FDD duplex mode having a $T_{CP}$=1/8·$T_u$ in the 802.16m standard. In FIG. 3, each frame has 5 ms and includes eight subframes. The subframes are divided into a type-1 subframe and a type-2 subframe. Namely, the type-1 subframe includes six OFDM symbols of 0.583 ms, and the type-2 subframe includes seven OFDM symbols of 0.680 ms. In case of the TDD duplex mode, there exists a transmitter transition gap (TTG) while DL is changed to UL and there exists a receiver transition gap (RTG) while UL is changed to DL. In case of the FDD duplex mode, there exists an idle time at the end of each frame.

DISCLOSURE OF INVENTION

Solution to Problem

Therefore, in order to address the above matters, the various features described herein have been conceived.

An aspect of the present invention is to effectively configure a particular channel in a system supporting various frame structures such as shown in FIGS. 1 to 3 to thus enhance channel performance and resource efficiency.

Another aspect of the present invention is to use a time domain (or a time interval), in which an idle time, an idle symbol, a TTG or an RTG existing in a frame structure as illustrated in FIGS. 1 to 3 is not generally used for transmission of an actual signal (data), for of a particular channel (e.g., a ranging channel) to thus enhance channel performance and resource efficiency.

According to an aspect of the present invention, there is provided a method for transmitting ranging information in a wireless communication system, including: configuring a ranging channel to transmit ranging information; and transmitting the ranging information via the configured ranging channel, wherein the ranging channel is configured to have a ranging cyclic prefix (RCP) time length determined according to a subframe type.

The ranging information may be transmitted by a mobile station (MS) to a base station (BS).

The ranging channel may include one or more RCPs, one or more ranging preamble (RP), and one or more guard times (GT).

The ranging channel may be configured to have one RCP, one RP, and one GT in this sequence.

The ranging channel may be configured to have one RCP, one RP, another RCP, another RP, and a GT in this sequence.

The ranging channel may be configured to have one RCP, one RP, another RP, and a GT.

The ranging channel may further include a guard band to prevent an inter-subcarrier interference with an adjacent channel.

The ranging channel may further include an SRS in consideration of multiplexing.

When the ranging channel is configured in a TDD and FDD unified duplex mode, the ranging channel may be used by using a preceding idle time of uplink (UL) subframes in the TDD duplex mode, and a ranging channel corresponding to one subframe length without an idle time may be used in the FDD duplex mode.

The ranging channel may have one or more ranging opportunities.

The length of the ranging channel may be equal to one subframe or may be longer than the length of one subframe.

The ranging channel may be configured in a subframe by using one or more time intervals among an idle time, an idle symbol, a BS receive/transmit transition gap (RTG), and a BS transmit/receive transition gap (TTG).

The ranging channel may be configured in at least two different types of subframes, and have a different RCP time length in the at least two different types of subframes.

According to another aspect of the present invention, there is provided a user equipment including: a module configuring a ranging channel in order to transmit ranging information and transmitting the ranging information via the configured ranging channel, wherein the ranging channel has an RCP time length determined according to a subframe type.

The module may be configured in at least two different types of subframes, and configure the ranging channel with a different RCP time length in the at least two different types of subframes.

According the exemplary embodiments of the present invention, in a general wireless communication system, because a time interval, such as an idle time, an idle symbol, an RTG, a TTG, and the like, not actually used for transmission of data or a signal in a data structure, namely, in a frame structure, transmitted and received between an MS and a BS, is used as a ranging channel, the channel performance and resource efficiency can be improved.

In addition, a ranging channel can be configured in two or more different types of subframes, and mutually different RCPs can be configured in the subframes.

The foregoing and other objects, features, aspects and advantages of the present invention will become more apparent from the following detailed description of the present invention when taken in conjunction with the accompanying drawings.

MODE FOR THE INVENTION

Figure 1:
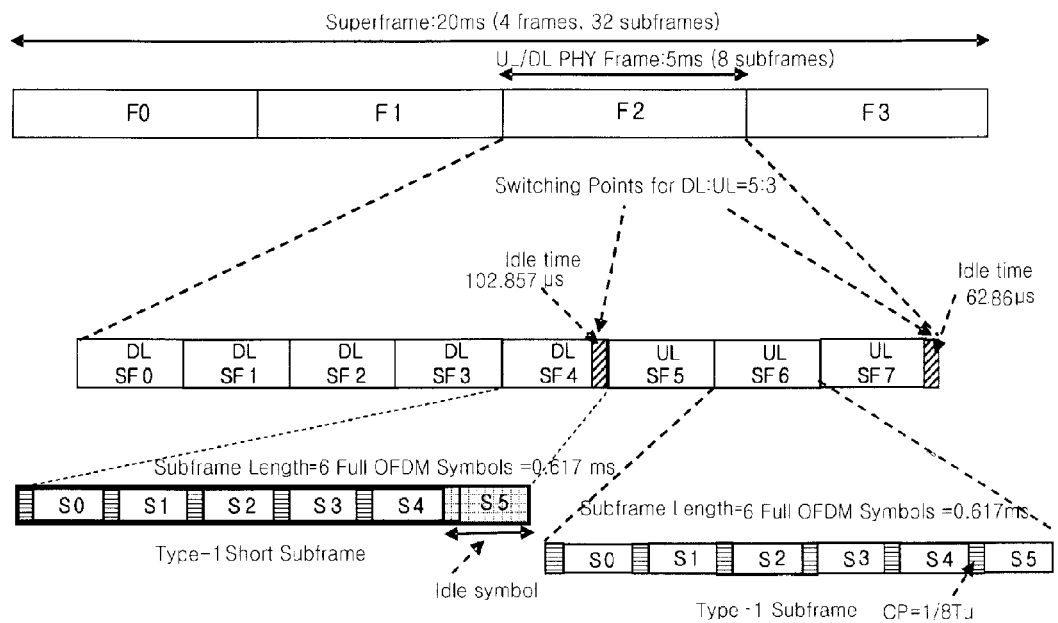
FIG. 1 illustrates a type-1 frame structure in the TDD duplex mode.
Figure 2:
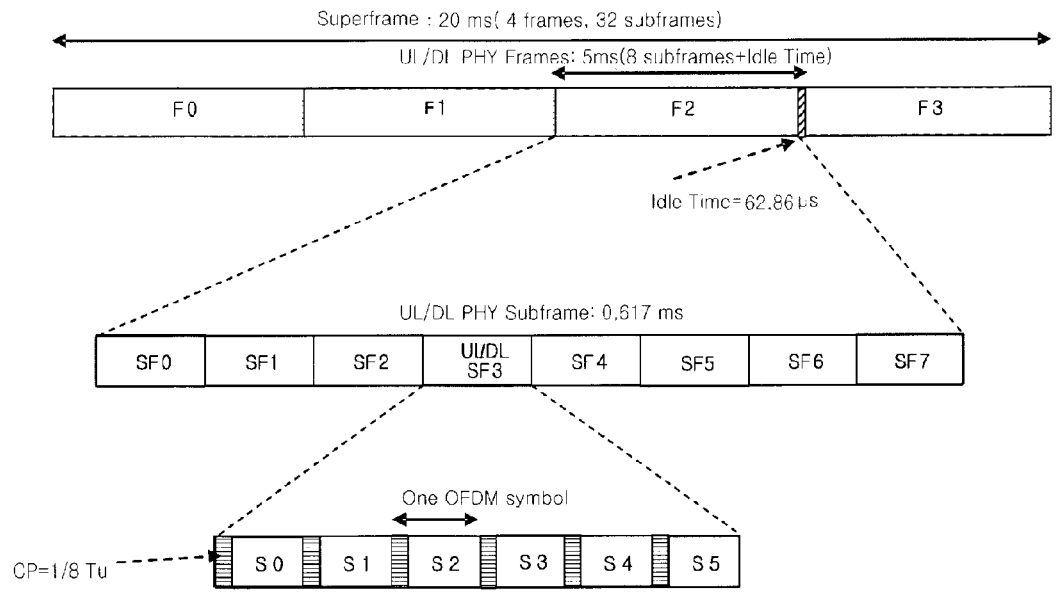
FIG. 2 illustrates the type-1 frame structure in the FDD duplex mode.
Figure 3:
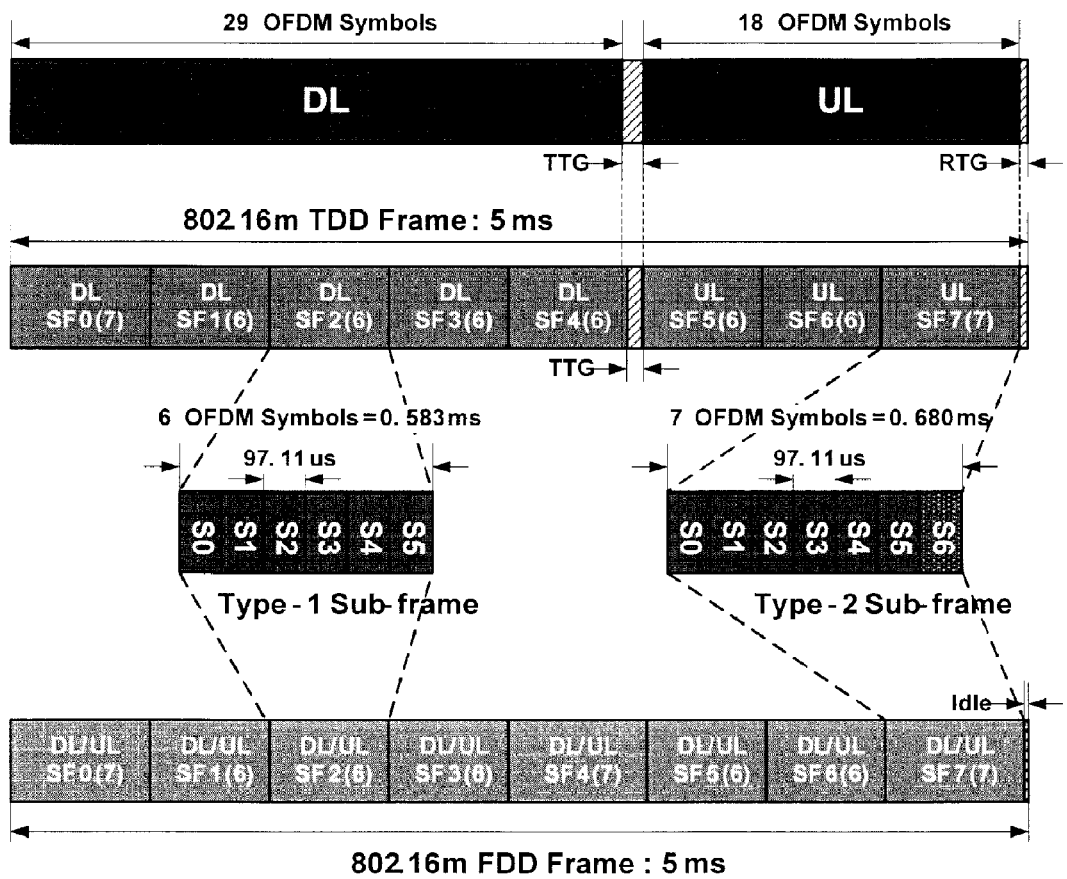
FIG. 3 illustrates a frame structure in a TDD and FDD duplex mode having a $T_{CP}$=1/8·$T_u$ in the 802.16m standard.

The present invention is applied to a method for configuring a frame structure and a ranging channel. However, without being limited thereto, the present invention can be also applicable to any data structure configuring method and wired/wireless communication system to which the technical ides of the present invention is applied.

The present invention may be modified variably and may have various embodiments, particular ones of which will be illustrated in drawings and described in detail. However, it should be understood that the following exemplifying description of the invention is not meant to restrict the invention to specific forms of the present invention but rather the present invention is meant to cover all modifications, similarities and alternatives which are included in the spirit and scope of the present invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned to be "connected" to or "accessing" another component, this may mean that it is directly connected to or accessing the other component, but it is to be understood that another component may exist in-between. On the other hand, when a component is mentioned to be "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Embodiments of the present invention will be described below in detail with reference to the accompanying drawings, where those components are rendered the same reference number that are the same or are in correspondence, regardless of the figure number, and redundant explanations are omitted.

The present invention is based upon recognition that when various types of data structures, namely, frame structures, transmitted and received between a mobile station (MS) and base station (BS) are supported in a general wireless communication system, for example, a particular control channel such as a ranging channel can be appropriately configured according to the frame structures to thereby enhance channel performance and resource efficiency.

The present invention is also based upon recognition that a time interval such as an idle time, an idle symbol, a receive/transmit transition gap (RTG), a transmit/receive transition gap (TTG), and the like, not actually used for transmission of data or a signal in a data structure, namely, in a frame structure, transmitted and received between the MS and the BS in the general wireless communication system, is used as a particular control channel, e.g., a ranging channel, thereby improving channel performance and resource efficiency.

The present invention proposes various frame structures that can be used as a particular control channel (e.g., a ranging channel) in a time interval such as an idle time, an idle symbol, an RTG, a TTG, and the like, during which data is not actually transmitted, in a general frame structure, and ranging channel configuring methods.

In configuring a ranging channel, whether or not a cyclic shift is used for increasing a ranging channel duration, a ranging subcarrier spacing, a ranging bandwidth, a ranging code type/length, a zero-correlation zone (opportunity (number of available codes), and the terms, such as the purposes (e.g., initial ranging, periodic ranging, handover ranging, bandwidth request, etc.) of a ranging channel) and the method (localized allocation, distributed allocation, sub-band, grouping, etc.) for using the frequency of a ranging channel, are not limited to the meaning of the terms themselves, and do not limit the technical idea of the present invention.

A method for configuring a ranging channel according to an exemplary embodiment of the present invention will now be described.

Figure 4:
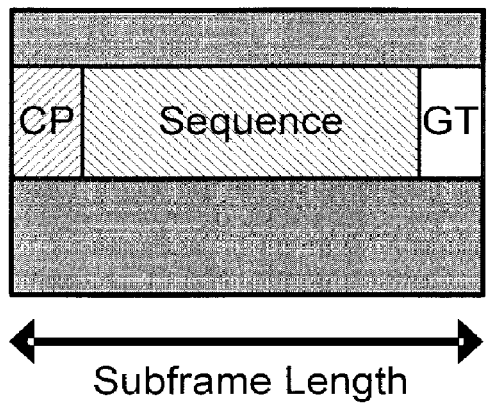
FIG. 4 illustrates a ranging channel configured with 'CP+preamble (namely, sequence)+GT'.
Figure 5:
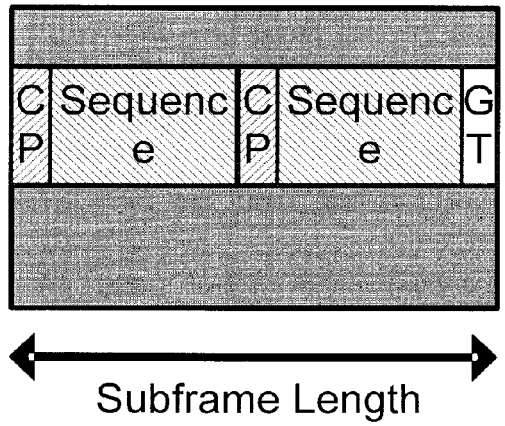
FIG. 5 illustrates a repeated structure of a ranging channel configured with 'CP+preamble+CP+preamble+GT'.
Figure 6:
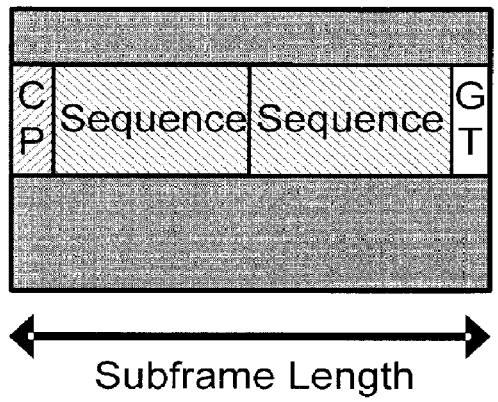
FIG. 6 illustrates a repeated structure of a ranging channel configured with 'CP+preamble+preamble+GT'.
Figure 7:
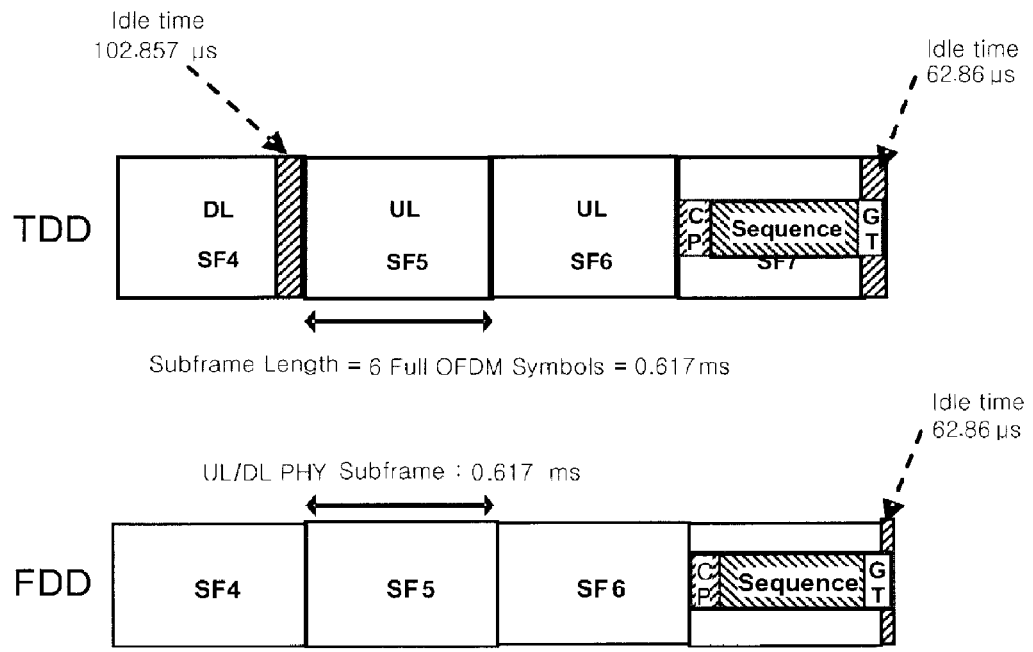
FIG. 7 illustrates the same ranging channels configured in different TDD/FDD multiplexing modes when $T_{CP}$=1/8·$T_u$ according to an exemplary embodiment of the present invention.

In the following description, it is assumed that a ranging channel includes three parts: a ranging cyclic prefix (RCP), a ranging preamble (RP) (or a sequence part), a guard time (GT) as shown in FIGS. 4 to 6. Also, it is assumed that a time length of a basic ranging channel is equal to the length of one subframe as shown in FIGS. 4 to 6. Meanwhile, such assumption is made for the description of the present invention, without limiting the configuration of the ranging channel. Several ranging opportunities may be configured in one subframe over physical resources that do not overlap. In addition, a ranging channel having a time length longer than one subframe may be configured.

FIG. 4 illustrates a ranging channel configured with 'CP+preamble (namely, sequence)+GT', and FIG. 5 illustrates a repeated structure of a ranging channel configured with 'CP+preamble+CP+preamble+GT'. In this case, it may be configured such that each MS transmits the entire signal corresponding to 'CP+preamble+CP+preamble', or it may be configured such that two types of 'CP+preamble' are interpreted as a ranging opportunity and each MS selects only one of the two types of 'CP+preamble' and transmits a signal. FIG. 6 illustrates a repeated structure of a ranging channel configured with 'CP+preamble+preamble+GT'.

In the structures of the ranging channels illustrated in FIGS. 4 to 6, a horizontal axis indicates a time domain and a vertical axis indicates a frequency domain, which may be a physical subcarrier or a logical subcarrier. Also, a particular frequency domain within a ranging region may be allocated merely as a guard band (or a guard subcarrier) to prevent an inter-subcarrier interference with an adjacent channel, rather than being used for an actual transmission. For example, a portion at both ends of the ranging channel in the frequency domain may be allocated as a guard band and not used for an actual transmission.

A TDD and FDD duplex mode-unified structure having $T_{CP}=1/8 \cdot T_u$ will now be described.

Ranging channels may use different time and frequency length values in through the same downlink signaling in the TDD and FDD duplex modes. For example, in the TDD duplex mode, a longer ranging channel may be used by using a preceding idle time of a UL subframe, and in the FDD duplex mode, a ranging channel which corresponds to the length of a single sub frame may be used without using the idle time.

Conversely, in order to simplify a system configuration, the same ranging channel may be used in the TDD and FDD duplex modes. When the ranging channel does not use the idle time, each subframe has the same length, so the same configuration may be used regardless of the duplex mode. When the preceding idle time is used in the UL subframe in the TDD duplex mode, because there is no such time domain in the FDD duplex mode, the same configuration cannot be used. However, if an idle time coming at the end of the UL subframe, because the same time domain in the FDD duplex mode, the same configuration can be used. Meanwhile, for a ranging configuration regardless of the duplex mode while using the idle time, the ranging channel must be positioned at the temporally final (last) subframe among the UL subframes. If a single ranging channel is longer than a single subframe or when several ranging channels are allocated to several subframes in the time and frequency domains, different subframes including the temporally final (last) subframe among the UL subframes may be used to allocate the ranging channel.

The ranging configuration according to an exemplary embodiment of the present invention includes the information regarding an overall time length and bandwidth of a ranging channel, and the length of the ranging CP, the preamble, and the guard time, which refers to information directly or indirectly transmitted to downlink.

In the above description, the same length is used in the TDD duplex mode and the FDD duplex mode, but the same structure may be used and only the length of the RCP may be different to be used. In this case, the same length of the RP may be used in order to implement simple hardware. Also, when TDD and FDD systems coexist closely, the same length of RP may be used in order to reduce an inter-cell interference.

For example, in the FDD duplex mode, a ranging channel (assuming that the GT is included) may be designed suitable according to the length of one subframe, and in the TDD duplex mode, a ranging channel having a length obtained by adding a portion of the TTG to the length of one subframe (including the GT) may be designed suitably according to he length of one subframe. For example, an implementation using a TTG-SSRTG will now be described. Here, it is assumed that the SSRTG has a length of 50 us ($=1120 \times T_{rtu}$), for the sake of brevity.

Figure 8:
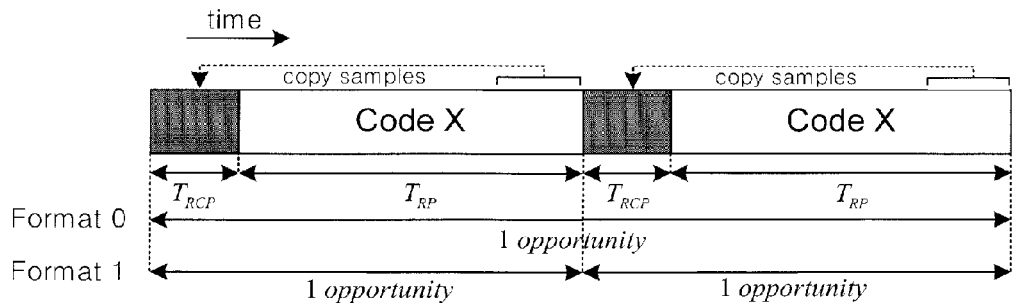
FIG. 8 illustrates ranging channel formats 0 and 1 in a time domain according to an exemplary embodiment of the present invention.

FIG. 8 illustrates ranging channel formats 0 and 1 in a time domain according to an exemplary embodiment of the present invention.

Figure 9:
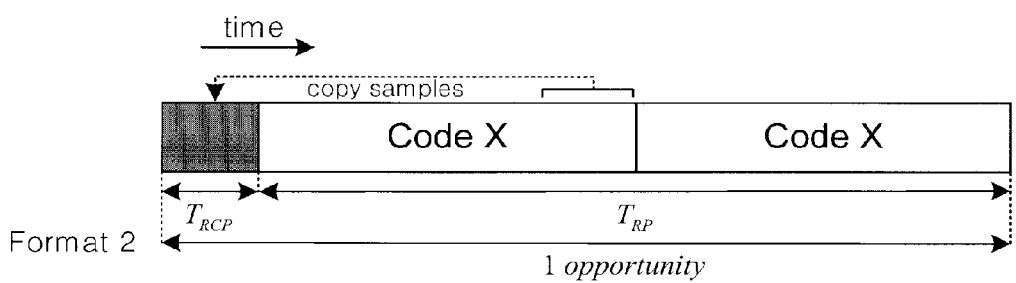
FIG. 9 illustrates a ranging channel format 2 in a time domain according to an exemplary embodiment of the present invention.

FIG. 9 illustrates a ranging channel format 2 in a time domain according to an exemplary embodiment of the present invention.

Figure 10:
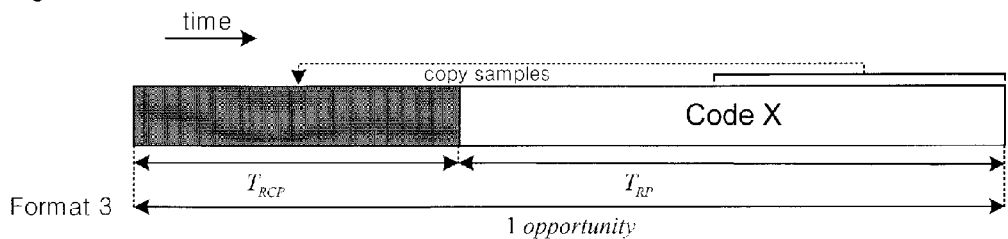
FIG. 10 illustrates a ranging channel format 3 in a time domain according to an exemplary embodiment of the present invention.

FIG. 10 illustrates a ranging channel format 3 in a time domain according to an exemplary embodiment of the present invention. As shown in FIGS. 8 and 9, when a ranging channel is configured in a single subframe, the ranging channel may be configured such that the time length of the RP is uniform while the time length of the RCP is different. Also, one or more time opportunities may be configured in the ranging channel as necessary. In this case the GT is omitted in FIGS. 8 to 10 for the sake of brevity, and the ranging channel may be configured by including the GT as necessary.

As shown in FIGS. 8 to 10, the physical ranging channel of an asynchronous MS includes the ranging preamble (RP) having the length of $T_{RP}$ and a ranging cyclic prefix (RCP) having the length of $T_{RCP}$. The ranging subcarrier spacing is $\Delta f_{RP}$, which is positioned in a space corresponding to consecutive $[8] \times P_{sc}$ data subcarriers. $P_{SC}$ indicates the size of the frequency domain of a contiguous resource unit, which is the same as the size of the frequency domain of a physical resource unit and equivalent to eighteen subcarriers.

When the ranging channel format in FIG. 8 is 0, the repeated RCP and RP are used as a single ranging opportunity by an asynchronous advance mobile station (AMS). In case of the ranging channel format 1 of FIG. 8, a single RCP and RP are part of 0 and are used as a ranging opportunity by the asynchronous AMS. The format 2 in FIG. 9 includes an RCP and repeated RPs, and there is no intermediate RCP in the format 0. Table 4 below shows ranging channel formats and their parameter values. In Table 4, the size of various fields on the time domain use Trtu=1/(10937.5×2048) seconds as a reference time unit.

TABLE 4

| Format No. | Ranging Channel Format | $T_{RCP}$ | $T_{RP}$ | $\Delta f_{RP}$ |
| --- | --- | --- | --- | --- |
| 0 | RCP + RP + RCP + RP | $T_g + K \times T_{rtu}^{(a)}$ | $15120 \times T_{rtu}$ | 4.375 kHz |
| 1 | RCP + RP | | | |
| 2 | RCP + RP + RP | $\alpha \times T_g$ | $2 \times 5120 \times T_{rtu}^{(b)}$ | |
| 3 | RCP + RP | $T_g + 14944 \times T_{rtu}$ | $16384 \times T_{rtu}$ | 1.3671875 kHz |

In the formats 0 and 1, the RCP follows the OFDMA parameters and the following subframe type:

$$K = \lceil \{[N\text{sym} \cdot Ts + \alpha - 2 \cdot (TRP + Tg)]/3\} Trtu \rceil \quad (1)$$

Here, Nsym is the number of OFDMA symbols, and Ts and Tg are 0 in the FDD duplex mode and are $T_{TTG}-1120 \times T_{rtu}$ in the TDD duplex mode.

The RP length of the format 2 in FIG. 9 corresponds to the overall length of the repeated ranging preamble.

$N_{sym}$ indicates the number of OFDMA data symbols in one subframe. In case of $T_{CP}=1/8 \cdot T_u$, $N_{sym}=6$, and in case of $T_{CP}=1/16 \cdot T_u$, $N_{sym}=6$ in the type-1 subframe and $N_{sym}=7$ in the type-2 subframe.

$T_S$ is an OFDMA symbol time and $T_S=T_b+T_g$. Here, Tb is an available symbol time and $T_b=1/\Delta f=N_{FFT}/Fs$ (e.g., 91.43 us) ($\Delta f$ is data subcarrier spacing), $N_{FFT}$ is the minimum power two-fold greater than $N_{used}$, Fs is data sampling frequency, Nused is the number of data subcarriers including DC subcarriers, and, $Tg(=T_{CP})$ is a time length of an OFDMA data CP, which is $T_b/8$ or $T_b/16$.

In case of the ranging opportunity of the asynchronous AMS, each user randomly selects one of available ranging sequences. When a ranging channel structure is the format 1 in FIG. 8, each user additionally selects one of the next time opportunities within the subframe. When the ranging channel format is configured as the format 0, 2, 3 or the format 1, a transmission start time of the ranging channel is aligned as a UL subframe start time in the AMS of the FDD duplex mode, and transmission of the ranging channel starts from 1120× $T_{rtu}$ after transmission of the final DL subframe is finished in the TDD duplex mode.

For the Format 1 in the second time opportunity, the transmission of the ranging channel starts $T_{RCP}+T_{RP}$ after the transmission time of the corresponding UL subframe for FDD duplex mode and it starts $T_{RCP}+T_{RP}+1120×T_{rtu}$ after the end of transmission time of the last DL subframe for TDD duplex mode.

In the exemplary embodiment of the present invention as described above, the TDD duplex mode and the FDD duplex mode have the same ranging channel formats. In addition, it has a time length of the same RP regardless of the duplex mode in each format. However, the length of the RCP and the transmission start time of the ranging signal are different in the TDD duplex mode and the FDD duplex mode. As noted in Equation (1), in the FDD duplex mode, the ranging channel (including the GT) is designed according to the length of a single subframe NSYM?T, and in the TDD duplex mode, the ranging channel is designed according to $N_{SYM}·T+\alpha$ ($=N_{SYM}·T+1120·T_{rtu}$), the length obtained by adding a portion of the TTG to the length of one subframe. Namely, although the same structure is used, the RCP, which is longer than that in the FDD duplex mode, is used in the TDD duplex mode, thereby extending a maximum supportable cell coverage.

In Table 4, in the format 3, the length of $T_{RCP}$ is the same regardless of the FDD/TDD. This is because the length of the RCP for supporting a cell radius of 100 km has been set so a longer RCP length is not necessary.

In Table 4, in the format 2, the length of $T_{RCP}$ may be used with '$\alpha$' instead of '$\alpha$+Tg'. Namely, in the FDD, the first RP is used as a virtual RCP, without an RCP, and only the second RP is used for a detection. In the TDD, the length of the RCP is used, and repeated RPs may be all used for a detection.

In Table 4, the format 2 is designed to have the configuration of the RCP with respect to a maximum RTD available with the TTG on the assumption that the length of $T_{RCP}$ is '$\alpha$+Tg' and '$\alpha$' has a time length of 'TTG-SSRTG'. With this configuration, when the length of the GT which is the same as the RTD within the RCP is considered, a portion of a time coming later within the overall ranging channel obtained by adding $\alpha$ to the time length of one subframe may have an unnecessary portion. Namely, if it is assumed that the entire subframe is a ranging channel, the length of a guard time (GT) more than necessary may be secured. However, in the system, a time delay of more than the maximum supportable RTD in the TTG does not need to be considered, so the use of the time length of the RCP is possible.

Alternatively, a time length of the maximum supportable RCP within the overall ranging channel obtained by adding a to the time length of one subframe may be possibly set. In Table 4, in the format 2, the length of TRCP may be 'Tg+m× $T_{rtu}$', instead of '$\alpha$+Tg', which is similar to that in the formats 0 and 1. Here, 'm' is defined as m=$_{\Gamma}$ $\{[N_{sym}·Ts+\alpha-(2·TRP+Tg)]/2\}/T_{rtu}$]. In the FDD, m may be 0 or a value obtained by the same calculation may be used as 'm'. Namely, a value, which is obtained by halving the length obtained by excluding the length of repeated RPs $2·T_{RP}$ and the length Tg of a maximum delay spread from the overall ranging length obtained by adding the length a of the partial section of the TTG to the length of one subframe $N_{sym}·T$, may be obtained as the RTD. Namely, when there exist one RCP and one GT within the ranging channel, the maximum available length of the RTD is m×$T_{rtu}$. And a value obtained by adding the length Tg to the maximum delay spread may be used as the RCP.

Namely, in the FDD, the first RP is used as a virtual RCP, without an RCP, and only the second RP is used for a detection. In the TDD, the length of the RCP is used, and repeated RPs can be all used for a detection.

In Table 4, in the format 2, the RCP+RP' may be used in the FDD, and the 'RCP+RP+RP' may be used in the TDD. Here, the length of the RCP in the FDD may be same as the length of the RP or may be determined as the sum of the RTD (200.138457 us) of a cell radius of 30 km and the maximum delay spread (11.428571 us for 1/8Tb or 5.714286 us for 1/16Tb). The length of the RCP in the TDD may be determined as $\alpha$+Tg like the example as described above.

Hereinafter, the TDD and FDD duplex mode-unified structure having a value of TCP=1/16·Tu will now be described.

Figure 12:
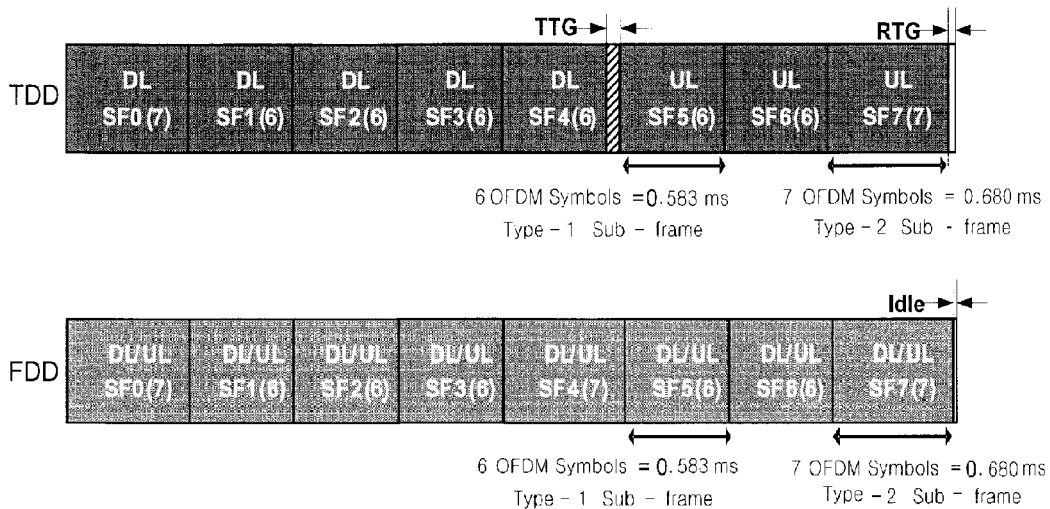
FIG. 12 illustrates the same ranging channels configured in different TDD/FDD multiplexing modes according to an exemplary embodiment of the present invention.

In case of $T_{CP}$=1/16·Tu, two types of subframe structures each having a different time length like the case illustrated in FIG. 12 are used. A ranging channel configuration fitting the length of the two types of subframes can be set.

For example, a ranging configuration for the type-1 subframe and a ranging configuration for the type-2 subframe can be separately set. For example, the ranging channel format may be determined as follows.

Figure 11:
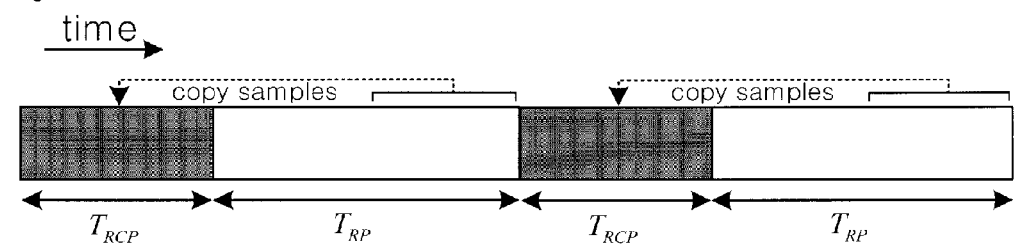
FIG. 11 illustrates the structure of a default ranging channel format.

A physical ranging channel for non-synchronized mobile stations is composed of the RP of length $T_{RP}$ corresponding to ranging subcarrier spacing $\Delta$fRP, and the RCP of length $T_{RCP}$ within localized bandwidth corresponding to consecutive [TBD]·$P_{SC}$ data subcarriers. $P_{SC}$ indicates the size of the frequency domain of a contiguous resource unit, which is the same as the size of the frequency domain of a physical resource unit and equivalent to eighteen subcarriers. A time-domain illustration of the default ranging channel structure is shown in FIG. 11.

Ranging channel formats and their parameter values are as shown in Table 5 below. In Table 5, the size of various fields on the time domain use Trtu=1/(10937.5×2048) seconds as a reference time unit.

TABLE 5

| Format No. | Ranging Channel Format | $T_{RCP}$ | $T_{RP}$ | $\Delta f_{RP}$ |
|---|---|---|---|---|
| 0 | RCP + RP + RCP + RP | $T_g + K × T_{rtu}$ | 15120 × $T_{rtu}$ | 4.375 kHz |
| 1 | RCP + RP | | | |
| 2 | RCP + RP + RP | $T_g$ | 2 × 5120 × $T_{rtu}$* | |
| 3 | RCP + RP | $T_g + 14944 × T_{rtu}$ | 16384 × $T_{rtu}$ | 1.3671875 kHz |

In Table 5, *means the total length of 'RP + RP'.

In Table 5, $$K=\lceil \{[Nsym·Ts-2·(TRP+Tg)]/3\}Trtu \rceil \qquad (2)$$

Here, Ts is an OFDMA symbol time, which is Ts=Tb+Tg. Here, Tb is an available symbol time and Tb=1/Δf=$N_{FFT}$/Fs (e.g., 91.43 us) (Δf is data subcarrier spacing), NFFT is the minimum power two-fold greater than $N_{used}$, Fs is data sampling frequency, Nused is the number of data subcarriers including DC subcarriers, and, Tg(=$T_{CP}$) is a time length of an OFDMA data CP, which is Tb/8 or Tb/16. Nsym indicates the number of OFDMA data symbols within one subframe. In case of $T_{CP}$=1/8·Tu, Nsym=6, and in case of $T_{CP}$=1/16·Tu, Nsym=6 in the type-1 subframe and Nsym=7 in the type-2 subframe.

The basic allocated time/frequency resource size of ranging channel format 0 and 1 is same. There is one time opportunity within a basic allocated unit for the ranging channel format 0. Otherwise, there are two time opportunities within a basic allocated unit which can be randomly selected by certain AMS for the ranging channel format 1. Each user randomly chooses one ranging preamble from available preambles in each cell when the ranging channel formats 0, 2 and 3 is used. Otherwise, each user randomly chooses one time opportunity from available two time opportunities within a ranging channel when the ranging channel formats 1 is used. Then, each user randomly chooses one ranging preamble from available preambles within a selected time opportunity in each cell. The set of preambles between two time opportunities is same in each cell). The start of the ranging channel format 1 with first time opportunity, 0, 2, and 3 shall be aligned with the start of the corresponding uplink subframe at the AMS assuming a timing advance of zero and the ranging channel format 1 with second time opportunity shall start $T_{RCP}$+$T_{RP}$.

The type-1 subframe and the type-2 subframe reflecting the length of one subframe $N_{sym}$·Ts from Equation (2) may use a different $T_{RCP}$ time length. Namely, a ranging channel fitting the length of the subframe can be configured depending on whether or not the subframe to which the ranging channel is allocated is the type-1 subframe or the type-2 subframe, without a resource waste.

Alternatively, a ranging channel may be set to be used only in a particular subframe. For example, a ranging channel may be designed according to the length of the type-1 subframe. In this case, ranging may be immediately attempted from the start of UL subframes. With this design, the ranging channel may be allocated only to the type-1 subframe or may be allocated also to type-2 subframe while using the RCP and RP with the same time length. When the ranging channel is allocated also to the type-2 subframe, one remaining symbol may be used for multiplexing a control channel such as a signal for broadcasting the above-mentioned SRS (sounding reference signal), CQI, and periodic ranging, and for a femtocell BS to broadcast its information (e.g., a cell ID, frequency assignment, etc.).

For another example, only the type-2 subframe may be used for a ranging channel. In this case, the type-1 subframe has a disadvantage in that it cannot allocate a ranging channel because of the relatively short subframe length but has an advantage in that it can expand a maximum supportable cell coverage of the ranging channel by using a longer time domain than that of the type-2 subframe.

FIG. 12 illustrates the same ranging channels configured in different TDD/FDD multiplexing modes according to an exemplary embodiment of the present invention. In FIG. 6, $T_{CP}$=1/16·Tu. This will now be described with reference to FIG. 12.

When a plurality of ranging channels are allocated in the time domain, there is a possibility that the type-1 and the type-2 subframes appear mixedly as adjacent subframes. In this case, because the cell coverage that can be supported by the ranging channel is restricted by the length of the RCP with the relatively short time length set in the type-1 subframe, the use of different RCPs is meaningless. Thus, it is possible to restrict the allocation of the ranging channel according to the subframe type of the start position of the allocation of the ranging channel.

The method of allocating a ranging channel only to the subframe such as the subframe type of the start position will now be described.

For example, in the IEEE 802.16e standard, time/frequency allocation of a ranging channel is made by OFDMA UL_MAP IE. The BS broadcasts a start position of the time/frequency allocation of the ranging channel by an 8-bit OFDMA symbol offset and a 7-bit subchannel offset. In addition, the BS broadcasts a time/frequency domain occupied by ranging channels starting from the start position of the time/frequency allocation of the ranging channel by 7-bit No. OFDMA symbols and 7-bit No. subchannels. Each mobile station configures a plurality of time/frequency ranging opportunities by the size (144 data subcarriers by two or four OFDMA symbols) within the time/frequency domain of the ranging channel, selects one of the time/frequency opportunities, selects a certain code within the time/frequency opportunities, and transmits a ranging signal. In this case, if the types of the adjacent subframes are different, their parameters (e.g., the length of RCP) may be different. The use of different parameters is meaningless. If the same length of RP is used and different RCPs are used, the cell coverage that can be supported by the ranging channel is restricted by the length of the RCP having the relatively shorter time length set in the type-1 subframe. Thus, the use of different RCPs is meaningless. Namely, the use of RCP suited for the length of the type-2 subframe is a waste of power of the mobile station, so they are not need to be used. In addition, when the length of one RCP and RP that do not depend on the subframe type is used, each length suited for the type-2 subframe cannot be used for the type-1 frame. Thus, it is possible to restrict allocation of the ranging channel according to the subframe type of the start position of the allocation of the ranging channel.

For example, when the start time/frequency position of the ranging channel is the type-1 subframe, the ranging channel adjusted in the time domain is allocated only to the type-1 subframes. In other words, if there are 'type-1; type-2; type-1' subframes in the time domain, the start time/frequency position of a ranging channel is the type-1 subframe, and there are more than one time opportunities (e.g., two time opportunities) in the time domain, then the ranging channel is not allocated to the second type-2 subframe and allocated to the third type-2 subframe. Namely, the ranging channel is not allocated to the different type of subframe from the subframe type of the start allocation position of the ranging channel, and allocated to the subframes, starting from the temporally closest subframe of the same type, among the adjacent subframes, according to the number of time opportunities.

Differently, if the start time/frequency position of the ranging channel is the type-2 subframe, the ranging channel adjacent in the time domain may be allocated only to the type-2 subframes.

When such use is used, $N_{sym}$ in Equation (2) is fixedly determined by the subframe type at the start time position of the ranging channels.

A method in which a ranging channel is allocated to the same type of subframe only when the subframe type of the start position is the type-2 subframe, and a ranging channel is allocated to all the subframes when the subframe type of the start position is the type-1 subframe will now be described.

In the method as described above, the ranging channel is allocated only to the same type of subframes. However, when the start time/frequency position of the ranging channel starts at the type-2 subframe, the ranging channel fitting the length of the type-2 subframe cannot be allocated to the type-1 subframe. Thus, when the start time/frequency position of the ranging channel starts at the type-2 subframe, preferably, the ranging channel is allocated only to the same type of subframe as described above. However, when the start time/frequency position of the ranging channel starts at the type-1 subframe, the ranging channel fitting the length of the type-1 subframe can be allocated to the relatively long type-2 subframe. Thus, when the start time/frequency position of the ranging channel starts at the type-1 subframe, the ranging channel may be allocated all the consecutive subframes regardless of their type in order to simplify the system configuration. Of course, in this case, one OFDMA data symbol within the type-2 subframe is not used as a ranging channel, so the remaining one OFDMA symbol may be used for multiplexing a control channel such as a signal for broadcasting the SRS (sounding reference signal), CQI, and periodic ranging, and for a femtocell to broadcast its information (e.g., a cell ID, frequency assignment, etc.). The one OFDMA symbol may be the most temporally preceding symbol or may be the most temporally final symbol.

When such use is used, $N_{sym}$ in Equation (2) is fixedly determined by the subframe type at the start time position of the ranging channels.

In the exemplary embodiment of the present invention as described above, the method for allocating a ranging channel dependent to the start position of the ranging channel has been described. Meanwhile, the above-described embodiment may vary according to a method of signaling broadcast after being allocated by the ranging channel. For example, unlike the above case, the position of the ranging channel may be allocated according to a predetermined rule (e.g., table) including subframe positions. In this case, the present invention can be applicable to determine predetermined subframe types.

A unified structure between $T_{CP}=1/8 \cdot Tu$ and $T_{CP}=1/16 \cdot Tu$ will now be described.

In case where $T_{CP}=1/8 \cdot Tu$ and $T_{CP}=1/16 \cdot Tu$, different subframe structures coexist. Thus, it is possible to set a ranging channel configuration fitting the length of subframes. For example, Table 5 and Equation (2) may be used. In case that $T_{CP}=1/8 \cdot Tu$ and $T_{CP}=1/16 \cdot Tu$ reflecting $N_{sym} \cdot Ts$, different time lengths of $T_{RCP}$ may be used in the type-1 and type-2 subframes. Namely, the ranging channel may be configured with a suitable length depending on whether or not the subframe to which the ranging channel is allocated is $T_{CP}=1/8 \cdot Tu$ or $T_{CP}=1/16 \cdot Tu$ and depending on whether or not the subframe is the type-1 subframe or the type-2 subframe when $T_{CP}=1/16 \cdot Tu$.

Figure 13:
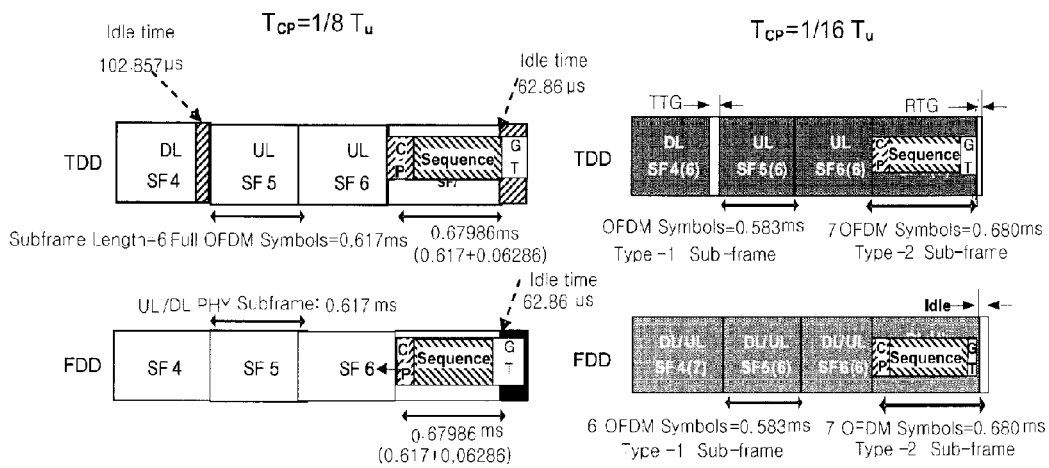
FIG. 13 illustrates the same ranging channels configured to have different CP lengths in TDD/FDD multiplexing modes according to an exemplary embodiment of the present invention.

Conversely, in order to simplify the system configuration, the ranging channel having the same length in $T_{CP}=1/8 \cdot Tu$ and $T_{CP}=1/16 \cdot Tu$ may be used. FIG. 13 illustrates the same ranging channels configured to have different CP lengths in TDD/FDD multiplexing modes according to an exemplary embodiment of the present invention. As shown in FIG. 13, when $T_{CP}=1/8 \cdot Tu$, a ranging channel is configured by including an idle time coming at the last of the UL subframes. The length of the time domain is about 0.68 ms. Meanwhile, as shown in FIG. 13, when $T_{CP}=1/16 \cdot Tu$, a ranging channel corresponding to the length of the type-2 subframe is configured. The length of the time domain is about 0.680 ms.

Accordingly, when $T_{CP}=1/8 \cdot Tu$ and $T_{CP}=1/16 \cdot Tu$, a ranging channel having the same time length can be configured. Thus, a ranging channel that can support the four types of modes can be configured with the single ranging channel configuration.

Figure 14:
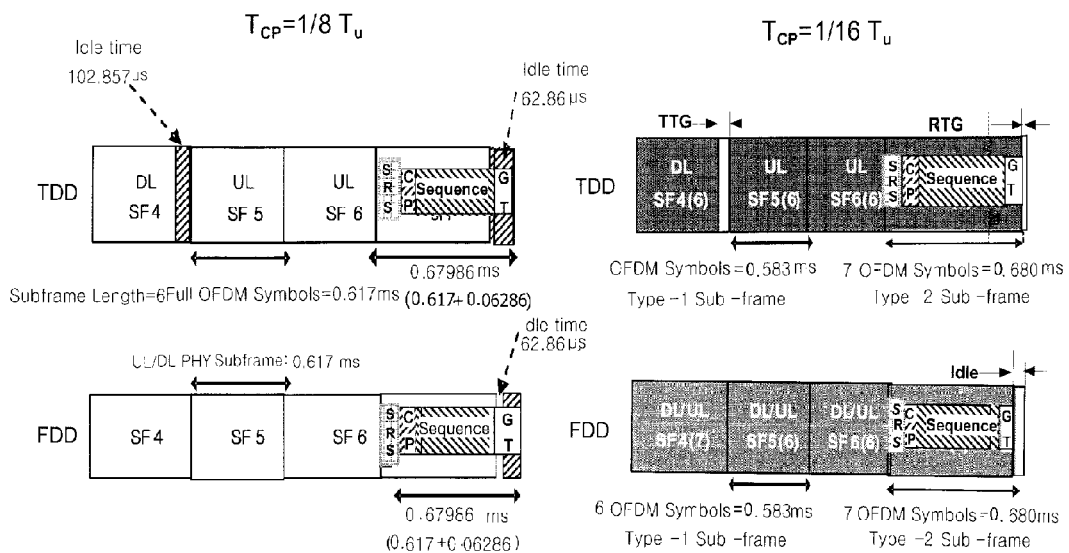
FIG. 14 illustrates the same ranging channels configured to have different CP lengths in TDD/FDD multiplexing modes and implementation of multiplexing with different channels according to an exemplary embodiment of the present invention.

Also, a different control channel as mentioned above can be multiplexed. FIG. 14 illustrates the same ranging channels configured to have different CP lengths in TDD/FDD multiplexing modes and implementation of multiplexing with different channels according to an exemplary embodiment of the present invention. Namely, FIG. 14 shows the case where the SRS is multiplexed to an OFDMA symbol temporally preceding the ranging CP. A ranging channel is designed as a time domain corresponding to the six OFDMA symbol durations, and the first symbol within the subframe is used for multiplexing the SRS. With such a structure, as shown in FIG. 14, the ranging that can support the four cases can be configured. Also, a loss of scheduling due to puncturing of the SRS or the like can be prevented by considering multiplexing of the SRS.

Meanwhile, in FIG. 14, a signal is not actually transmitted during the guard time (GT), so it may not be actually specified. In this case, the time length obtained by subtracting the length of the data CP from the ranging CP may be interpreted as the length of the GT of the ranging channel. Also, in a different method, a time domain, excluding the lengths of the ranging CP and the preamble from the length (or its multiple) of a subframe or from the sum of the length of the subframe (or its multiple) and an idle time, may be interpreted as the GT.

The present invention as described above may be differently applied according to the purpose of each channel. In other words, a different method may be applicable in the initial ranging, in the periodic ranging, and in the bandwidth request transmission.

Figure 15:
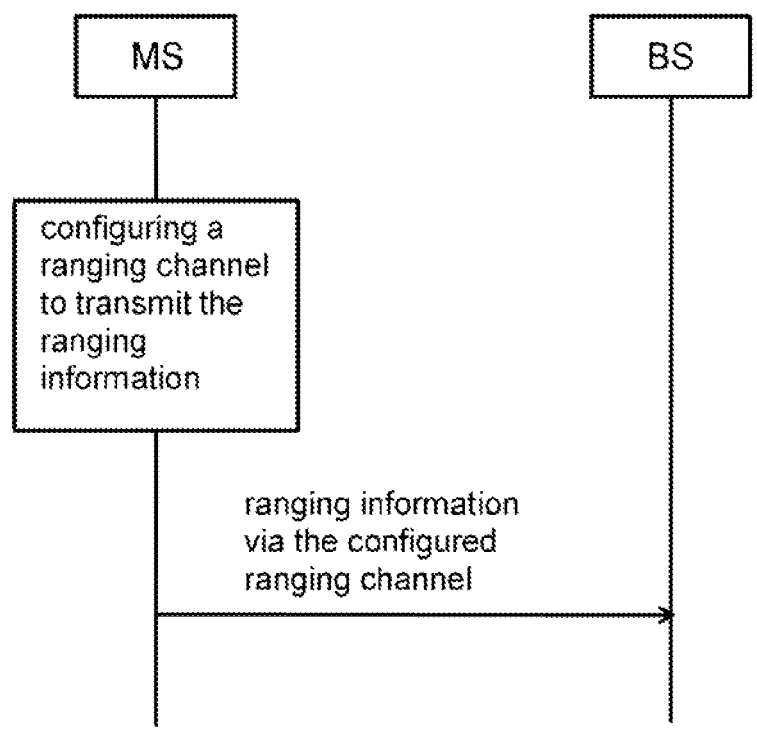
FIG. 15 illustrates a method for transmitting ranging information in a wireless communication system according to an embodiment of the present invention.

A mobile terminal according to an exemplary embodiment of he present invention will now be described (see, for example, FIG. 15).

The mobile terminal according to an exemplary embodiment of the present invention designates any device that can perform the technical features of the present invention. Namely, the mobile terminal has a comprehensive meaning, which may include a mobile communication terminal (e.g., a user equipment (UE), a cellular phone, a DMB phone, a game phone, a camera phone, a smart phone, etc.), and a notebook computer, a desktop computer, a personal digital assistant (PDA), a white appliance, and the like.

The terminal according to an exemplary embodiment of the present invention includes a module for performing the method for configuring the ranging channel and transmitting the configured ranging channel as described above. Here, the module may be implemented as hardware, software, or hardware having software. In addition, the name of the module is a comprehensive name including every element that can implement technical characteristics of the present invention such as a controller, a processor, and the like, without being limited to the function of the term itself.

In more detail, the terminal according to an exemplary embodiment of the present invention includes a module for configuring a ranging channel to transmit ranging information; determining a time length of a ranging cyclic prefix (RCP) of the ranging channel according to a subframe type; and transmitting by the terminal the ranging information to a BS by using the RCP-determined ranging channel via uplink.

The module may be configured in at least two different types of subframes, and the ranging channel is configured with a different RCP time length in the different types of subframes.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal).

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for transmitting ranging information in a wireless communication system, the method comprising:
configuring a ranging channel in a subframe to transmit the ranging information; and transmitting the ranging information via the configured ranging channel,
wherein the ranging channel is configured to have a ranging cyclic prefix (RCP) time length based on a cyclic prefix (CP) time length ($T_g$) and a number of orthogonal frequency division multiplexing (OFDM) symbols in the subframe ($N_{sym}$);
wherein the ranging channel is configured in at least two different types of subframes, and has a different RCP time length in the at least two different types of subframes.

2. The method of claim 1, the ranging information is transmitted by a mobile station (MS) to a base station (BS).

3. The method of claim 1, wherein the ranging channel comprises one or more RCPs, one or more ranging preamble (RP), and one or more guard times (GT).

4. The method of claim 3, wherein the ranging channel is configured to have one RCP, one RP, and one GT in this sequence.

5. The method of claim 3, wherein the ranging channel is configured to have one RCP, one RP, another RCP, another RP, and a GT in this sequence.

6. The method of claim 3, wherein the ranging channel is configured to have one RCP, one RP, another RP, and a GT.

7. The method of claim 3, wherein the ranging channel further comprises a guard band to prevent an inter-subcarrier interference with an adjacent channel.

8. The method of claim 3, wherein the ranging channel further comprises a sounding reference signal (SRS) in consideration of multiplexing.

9. The method of claim 1, wherein, when the ranging channel is configured in a time division duplex (TDD) and frequency division duplex (FDD) unified duplex mode, the ranging channel is used by using a preceding idle time of uplink (UL) subframes in the TDD duplex mode, and a ranging channel corresponding to one subframe length without an idle time is used in the FDD duplex mode.

10. The method of claim 1, wherein the ranging channel has one or more ranging opportunities.

11. The method of claim 1, wherein the length of the ranging channel is equal to one subframe or is longer than the length of one subframe.

12. The method of claim 1, wherein the ranging channel is configured in the subframe by using one or more time intervals among an idle time, an idle symbol, a base station (BS) receive/transmit transition gap (RTG), and a BS transmit/receive transition gap (TTG).

13. A mobile station (MS) in a wireless communication system, the MS comprising: a module configuring a ranging channel in order to transmit ranging information and transmitting the ranging information via the configured ranging channel,
wherein the ranging channel has a ranging cyclic prefix (RCP) time length determined based on a cyclic prefix (CP) time length ($T_g$) and a number of orthogonal frequency division multiplexing (OFDM) symbols in the subframe ($N_{sym}$);
wherein the module is configured in at least two different types of subframes, and configures the ranging channel with a different RCP time length in the at least two different types of subframes.

* * * * *

UNITED STATES PATENT AND TRADEMARK OFFICE
CERTIFICATE OF CORRECTION

| | | |
|---|---|---|
| PATENT NO. | : 8,750,162 B2 | Page 1 of 1 |
| APPLICATION NO. | : 13/142842 | |
| DATED | : June 10, 2014 | |
| INVENTOR(S) | : Hyun-Woo Lee et al. | |

It is certified that error appears in the above-identified patent and that said Letters Patent is hereby corrected as shown below:

On the title page, item (73) Assignee: LG Eletronics Inc., Seoul (KR); delete "Eletronics" and insert --Electronics--.

Signed and Sealed this
Second Day of September, 2014

Michelle K. Lee
*Deputy Director of the United States Patent and Trademark Office*